US008104038B1

(12) United States Patent
Graupner

(10) Patent No.: US 8,104,038 B1
(45) Date of Patent: Jan. 24, 2012

(54) MATCHING DESCRIPTIONS OF RESOURCES WITH WORKLOAD REQUIREMENTS

(75) Inventor: Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1427 days.

(21) Appl. No.: 11/170,590

(22) Filed: Jun. 29, 2005

Related U.S. Application Data

(60) Provisional application No. 60/583,841, filed on Jun. 30, 2004.

(51) Int. Cl.
*G06F 9/46* (2006.01)

(52) U.S. Cl. ........................................................ 718/104

(58) Field of Classification Search ................... 718/104
See application file for complete search history.

(56) References Cited

U.S. PATENT DOCUMENTS

| | | | | |
|---|---|---|---|---|
| 6,519,762 | B1 * | 2/2003 | Colligan et al. | 717/170 |
| 7,356,679 | B1 * | 4/2008 | Le et al. | 713/1 |
| 2003/0005083 | A1 * | 1/2003 | Owhadi et al. | 709/218 |
| 2003/0046529 | A1 * | 3/2003 | Loison et al. | 713/2 |
| 2004/0073673 | A1 * | 4/2004 | Santos et al. | 709/226 |
| 2005/0050200 | A1 * | 3/2005 | Mizoguchi | 709/226 |
| 2006/0075399 | A1 * | 4/2006 | Loh et al. | 717/174 |

OTHER PUBLICATIONS

Ahmed, K. et al., "The Cluster as Server: An Integrated Approach to Managing Clusters", downloaded Jun. 29, 2005.

Dorigo, M. et al., "The Ant System: Optimization by a Coloy of Cooperating Agents", IEEE Transactions on Systems, Man, and Cybernetics—Part B, vol. 26, No. 1, 1996.

Estrin, D. et al., "Next Century Challenges: Scalabe Coordination in Sensor Networks", Mobicom '99, Seattle, WA, 1999.

Foster, I. et al., "The Grid: Blueprint for a New Computing Infrastructure", Morgan Kaufmann Publishers, 1999, pp. 279-293.

Ratnasamy, S. et al., "A Scalable Content-Addressable Network", downloaded Jun. 29, 2005.

Schoonderwoerd, R. et al., "Ants for Load Balancing in Telecommunications Networks", downloaded Jun. 29, 2005.

Werger, B. et al., "From Insect to Internet: Situated Control for Networked Robot Teams", Annals of Mathematics and Artificial Intelligence, 2000.

"Open Grid Services Infrastructure (OGSI)" Version 1.0, Jun. 27, 2003, http://www.ggf.org/ogsi-wg.

HP Smartfrog, http://www.hpl.hp.com/research/smartfrog/, downloaded Jan. 25, 2005.

HP Utility Data Center, http://h71028.www7.hp.com/enterprise/cache/4269-0-0-0-121.aspx, downloaded Jan. 25, 2005.

IBM, Autonomic Computing Manifesto, http:www.research.ibm.com/autonomic/manifesto, downloaded Jun. 29, 2005.

IBM eLiza, http://www-1.ibm.com/servers/autonomic/, downloaded Jun. 27, 2005.

IBM xCat, http://www.alphaworks.ibm.com/tech/xCAT, downloaded Jan. 26, 2005.

IBM, Oceano Project, http://www.research.ibm.com/oceanoproject/, downloaded Jun. 27, 2005.

OpsWare, http://www.opsware.com/, downloaded Jun. 27, 2005.

SAP, downloaded Jun. 29, 2005.

Sun Microsystems, http://www.sun.com/software/gridware/, downloaded Jan. 26, 2005.

* cited by examiner

*Primary Examiner* — Emerson Puente
*Assistant Examiner* — Gregory Kessler

(57) ABSTRACT

Workload requirements for an application to be deployed in a system are received. Descriptions of resources in the system are matched with the workload requirements.

20 Claims, 7 Drawing Sheets

SYSTEM 311
312
SYSTEM ADMINISTRATOR
REQUEST FOR APPLICATION DEPLOYMENT 310
OVERLAY NETWORK 112
DESCRIPTOR REGISTRY 301
DESCRIPTORS (IMAGE, SERVER, SERVICE) 130
130
MATCHMAKING ENGINE 302
IMAGE DOWNLOAD SYSTEM 303
REQUEST IMAGE
EXTERNAL IMAGE PROVIDER 320
IMAGE LIBRARY 304
DEPLOYMENT LAYER 140

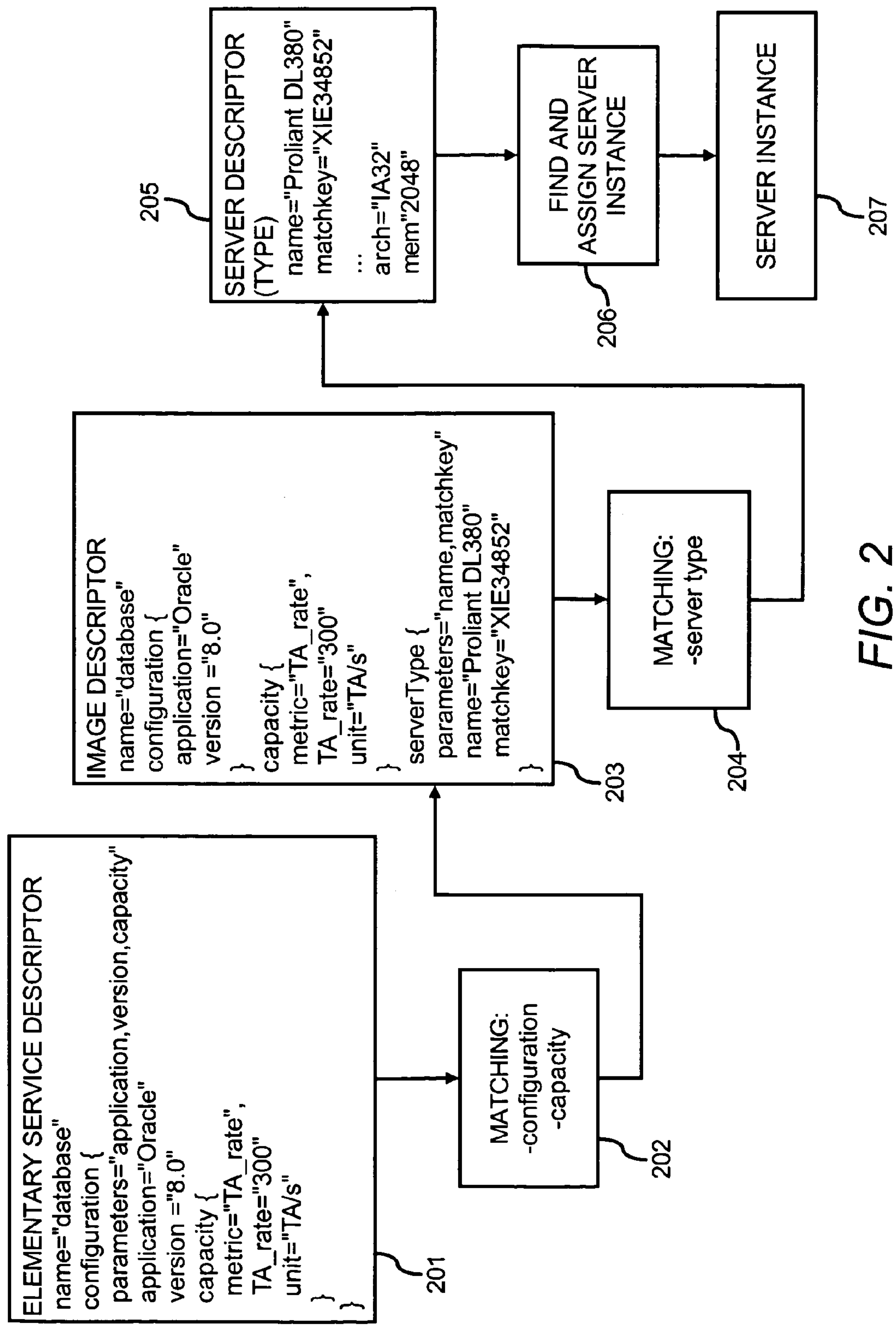
ELEMENTARY SERVICE DESCRIPTOR
name="database"
configuration {
parameters="application,version,capacity"
application="Oracle"
version ="8.0"
capacity {
metric="TA_rate",
TA_rate="300"
unit="TA/s"
} }
201
MATCHING:
-configuration
-capacity
202
IMAGE DESCRIPTOR
name="database"
configuration {
application="Oracle"
version ="8.0"
}
capacity {
metric="TA_rate",
TA_rate="300"
unit="TA/s"
}
serverType {
parameters="name,matchkey"
name="Proliant DL380"
matchkey="XIE34852"
}
203
MATCHING:
-server type
204
SERVER DESCRIPTOR
(TYPE)
name="Proliant DL380"
matchkey="XIE34852"
...
arch="IA32"
mem"2048"
205
FIND AND
ASSIGN SERVER
INSTANCE
206
SERVER INSTANCE
207
FIG. 2

MATCHING DESCRIPTIONS OF RESOURCES WITH WORKLOAD REQUIREMENTS

PRIORITY

The present application claims priority under 35 U.S.C. §119(e) to the Provisional U.S. Patent Application Ser. No. 60/583,841 filed on Jun. 30, 2004.

TECHNICAL FIELD

This technical field relates generally to matching descriptions of resources with workload requirements.

BACKGROUND

Enterprise applications typically consist of various components such as an access tier, an application server tier, and a backend tier. In order to deploy an enterprise application, all of its components, including software and hardware must be selected, and the selected hardware and software must be compatible. For example, certain types of operating systems may only run on certain servers, and so on. Furthermore, in order to support a desired capacity of an enterprise application, its components must be configured (or sized) accordingly. Conventionally, application engineers use sizing, configuration tables, tools and benchmark recommendations to design and deploy an appropriately sized application environment comprised of a set of appropriately sized components and deploy it on a set of resources in a data center. However, this process is primarily manual and is time consuming and complex. Furthermore, many of the manual calculations are highly prone to error possibly resulting in deploying a configuration that may not meet service requirements.

SUMMARY

According to an embodiment, workload requirements for an application to be deployed in a system are received. Descriptions of resources in the system are matched with the workload requirements.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 2 illustrates a data flow diagram for matching descriptors, according to an embodiment;

DETAILED DESCRIPTION

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Changes may be made to the embodiments without departing from the spirit and scope of the embodiments.

1. System Overview

Figure 1:
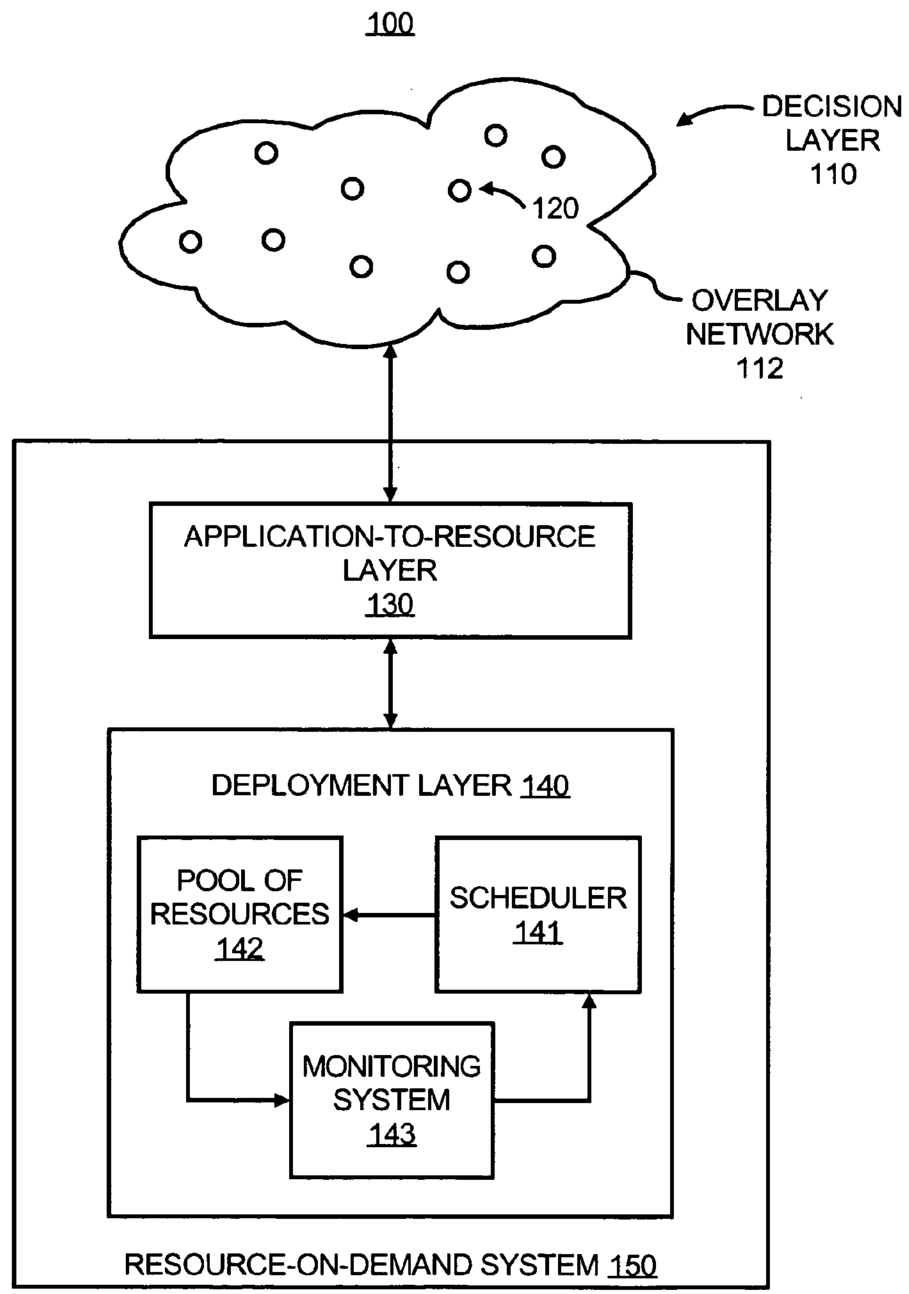
FIG. 1 illustrates a system, according to an embodiment.

FIG. 1 illustrates a system 100 according to an embodiment that is operable to place a workload. A workload includes one or more software applications, referred to as applications or services. The system 100 includes a decision layer 110, an application-to-resource layer 130, and a deployment layer 140. The decision layer 110 is operable to select a host for placing a workload. For example, a request for placing a new workload or a request for relocating an existing workload, such as a workload currently hosted by a system but needs to be moved due to a service violation or over loading, is received by the decision layer 110 and the decision layer 110 selects a host to run the workload. After a host is selected, the application-to-resource layer 130 is operable to select resources, for example, in the host, to run the workload. The deployment layer 140, for example, deploys the workload on the selected resources. The decision layer 110, the application-to-resource layer 130, and the deployment layer 140 are described in further detail below.

The decision layer 110 stores meta data for a plurality of systems that may host a workload. Examples of the meta data may include capacities and utilizations of the hosts and other information useful for determining whether a host can satisfy workload requirements for hosting a workload. In one embodiment, the systems or hosts are resource-on-demand systems. The resource-on-demand systems may include systems that are operable to provision resources for a workload if the system is selected or requested to host the workload. Provisioning resources, for example, includes assigning resources in the system to workloads hosted by the system. In an embodiment, the systems are operable to change resource assignments to accommodate changing workload demands or to accommodate new workloads. One host is shown, such as the resource-on-demand system 150, but the decision layer 110 is connected to several potential hosts, such as several resource-on-demand systems, and is operable to select a host for placing a workload.

In one embodiment, the decision layer 110 includes an overlay network 112 including overlay nodes 120. The overlay network 112 is a logical representation of an underlying physical network, such as a peer-to-peer network or other type of network. An overlay node as used herein may include computer programs and/or data, such as meta data about a computer system. The overlay node is included in the decision layer 110 and resides on a computer system where meta data is stored, and computations for decision-making, as explained below, are performed. The overlay nodes 120 may reside on different computer systems, and the overlay nodes 120 can communicate via the overlay network protocols.

The overlay network 112 forms a decentralized, distributed structure, which may be scalable to large scales. The overlay network 112 is used to store information about resource-on-demand systems such as data centers or computer systems in data centers and execute a distributed control algorithm for decision making about selecting a resource-on-demand system for workload placement or for decision making about allocating resources within resource-on-demand systems. For example, a distributed control algorithm for workload placement is used to select a resource-on-demand system to host a workload. A distributed control algorithm is an algorithm that may be executed by more than one node. For example, the distributed control algorithm for workload placement includes an algorithm where placement decisions for placing a workload may be made at different overlay nodes or may involve data stored at different overlay nodes.

In another example, a distributed control algorithm observes whether capacity-demand conditions are kept in balance throughout the overlay topology and eventually triggers control actions directed to resource-on-demand systems causing adjustments therein. Information relevant to workload placement, such as the meta data described above, is stored and maintained in the overlay network 112. Embodiments of distributed control algorithms for workload placement and a description of the overlay network 112 is also provided in U.S. Patent Application Serial Number, entitled "Workload Placement Among Resource-On-Demand Systems", by Sven Graupner, which is assigned to the same assignee as the present application and which is hereby incorporated by reference in its entirety.

The application-to-resource layer 130 and the deployment layer 140 may be included in each host that may host a workload, such as the resource-on-demand system 150. The application-to-resource layer 130 is operable to select resources in the host to run a workload, such as workload being placed in the resource-on-demand system 150 after the decision layer 110 selected the resource-on-demand system 150 to host the workload.

The application-to-resource layer 130 manages information about resources in the resource-on-demand system 150. The information may include descriptions with attributes and values for each resource and relationships among descriptions for representing the recursive aggregation of application components to create a target application environment comprising the workload being placed on the resource-on-demand system 150.

Based on the descriptions of resources and matchmaking between them, the application-to-resource layer 130 is operable to select resources comprising appropriately sized application components that fit together in order to produce an appropriately sized application environment.

Application sizing is the determination of what quantities of resources are needed to meet certain requirements or level of use for a particular application. For example, a database application may be sized differently based on the number of users to be supported. For example, the database application may require a single server to support 100 users. However, 5 servers may be required to support 1000 users.

When a workload is to be placed in the resource-on-demand system 150, the application-to-resource layer 130 receives workload requirements of the workload being placed. These requirements may include high-level requirements, such as the type of application, capacity parameters, such as the number of users to be supported, and configuration parameters. The application-to-resource layer 130 matches the workload requirements with resources in the resource-on-demand system 150 that can satisfy the requirements using the resource descriptions to provide an appropriately sized application environment.

The deployment layer 140 deploys the workload on the resources selected by the application-to-resource layer 130. The deployment layer 140, for example, includes a scheduler 141, a pool of resources 142, and a monitoring system 143. The scheduler 141 assigns resources from the pool of resources 142 to applications hosted by the resource-on-demand system 150, and for example sends control instructions to the resources to configure the resources to run an application, as is known in the art. The pool of resources 142 may include hardware and software, such as servers with processors, memory, servers, operating systems, applications, and the like. In one embodiment, the pool of resources 142 may include images. An image may include all the software needed to run an application of a particular size. For example, an image for a database application may include the database application, operating system and other software needed to run the application. The software needed to run the application is included in the application components for the application. The image may be stored on a disk or other storage device. Images may be created when needed, may be transferred from external sources into the resource-on-demand system 150 or may be saved and used when needed to allow for fast and easy deployment. Also, images may be used to deploy applications having different sizes.

The resource-on-demand system 150 may include a monitoring system 150 that is operable to measure metrics for determining the performance of resources deployed to run applications. The measured metrics may be monitored by the scheduler 141 or other systems to detect over loads or service violations. An overload condition may cause a workload to be relocated to another host.

One example of a resource-on-demand system that may be used is a data center that includes resources, such as servers, which are provisioned for workloads. In one example, the data center is operable to provision servers to workloads based on varying workload demands. Also, in addition to being able to provision entire servers, the data center may provision virtual servers, which may be a combination of processors, memory and other resources not necessarily on a single server. Built-in intelligence in the data center provides self-adapting capabilities to scale resources up or down depending on demand while providing a consistent level of service.

The data center is also operable to preconfigure application components as disk images, for example, stored in storage arrays. On request, an application can be instantiated by selecting an image with a matching configuration of the application and attaching it onto a matching server. Images can be provided for multiple capacity configurations to support application sizing and may be provided for servers of same or different types. An entire application environment can be provided using images of its application components. Application environments of different sizes can be provided similarly.

2. Meta Data for the Application-to-Resource Layer

The application-to-resource layer 130 stores meta data for selecting resources that can satisfy workload requirements. The meta data may include descriptors of resources in a system that is deploying the application, such as the resource-on-demand system 150. Resources include software resources, such as application components, and hardware resources, such as processors, memory, servers, and the like. Examples of types of descriptors that may be stored in the application-to-resource layer 130 include image descriptors, resource descriptors, and service descriptors.

The image descriptors include descriptions of application components including their capacities and types of resources, such as server types, that are compatible with the application components and are operable to run the application components. The application components are software needed to run the application. The application components may each perform a different function, such as accessing data, encapsulating business rules, handling user interaction, and others, that when combined provides all the functionality of the application. The application components may include other software also, such as the operating system. An example of information included in an image descriptor is as follows:

Image Descriptor image name, id;

operating system name and version (e.g. OS="Redhat Linux", version="7.0"); application name and version (e.g. application="Oracle", version="8.0");

server type for which the image has been configured (e.g. serverType="Proliant DL380", matchKey="X1E34852", vendor="HP"); and capacity description for the configured application component on the target server (e.g. metric="TA_rate", TA_rate="300", unit="TA/s").

TA is transactions, and TA/s is TA per second. The information above that may be included in the image descriptor is provided by way of example. The server type is the type of resource that the image is configured to run on. The server type may include resource types other than servers, such as processor types, and the like. The server type is associated with a server type that is available in the resource-on-demand system 150. The match key may be used to match the image with the correct server type.

The capacity description may be used for application sizing. For example, the applications with greater demand may require more resources. The metric selected to represent capacity in the example above is transactions per second (TA/s). Other metrics may be used.

Capacities may be normalized such that heterogeneous resources can be compared and resources can be assigned to applications with confidence that the resources have sufficient capacity to satisfy the workload requirements. According to an embodiment, resource shares are used to compare capacities of resource-on-demand systems for workload placement decisions. A resource share represents a normalized metric normalized to a chosen base unit that can be used to express a resource-on-demand system configuration's capability of handling a maximum amount of workload demand related to a particular type of application or class of service.

A particular metric may be selected for determining resource shares. Also, resource shares may be different for different types of applications or different classes of services. For example, a resource share for a database application is different than a resource share for a web server application.

An example of normalizing resources is as follows. In this example, the particular metric selected for determining resource shares is transactions per second (TA/s). A first configuration is capable of handling 100 TA/s for a first application. A second configuration is capable of handling 250 TA/s for a second application. The second configuration, for example, may be for a second resource-on-demand system with more resources. The first and second applications may be different but they are of the same type or class. For example, database applications, such as ORACLE and MYSQL may be normalized to the same normalized base unit. Also, the first and second applications may be the same applications.

Resource shares are normalized to a chosen base unit, which is a benchmark capability. For example, the chosen base unit is 100 TA/s for that type of business application. 100 TA/s for that type of business application represents a resource share of 1.0. Thus, the first resource has 1.0 resource shares and the second resource has 2.5 resource shares, expressing that the second resource is 2.5 times more powerful (or has 2.5 times the capacity) than the benchmark.

Workload requirements may be expressed in terms of service shares, which may be based on the current utilization of resources in a resource-on-demand environment. The service shares may be expressed as a current utilization percentage of resource shares of a resource-on-demand system. Thus, the resource shares may be used to determine whether a resource-on-demand system is operable to satisfy the workload requirements of a workload being placed. Different workloads may require a different number of resource shares. For example, application sizing may be expressed in terms of resource shares. For example, the type of application is a database application serving 10 users. That application may require 1 resource share. The same database application serving 1000 users may then require 10 resource shares. Thus, application service shares may be compared to resource shares for resources to determine whether a resource has sufficient capacity to satisfy workload requirements.

Resource descriptors are another type of descriptor that may be stored in the application-to-resource layer 130 and may be used to select resources for deploying an application. The resource descriptor may include the following information:

Resource Descriptor server name, id;

server type for which images have been configured (e.g., serverType="Proliant DL380", matchKey="X1E34852", vendor="HP");

further server properties (e.g. arch="1A32", memsize="2048", etc.);

availability information for instances of that server type (e.g., list of id's of currently available server instances).

The information above that may be included in a resource descriptor is provided by way of example. Also, resource descriptors may be provided for resources other than servers.

A third type of descriptor that may be stored in the application-to-resource layer 130 may be a service descriptor. Service descriptors may include descriptions of application environments including capacity parameters and a description of application components, such as an application, application programs and application data, operating system, and other software components. Service descriptors may also include mapping relationships between a desired capacity for an application environment and the needed application components. These mappings relationships are used for application sizing.

Two types of service descriptors may be stored in the application-to-resource layer 130. The two types are elementary service descriptors and composed service descriptors. Elementary service descriptors represent application components that are not further resolved and, for example, refer to one image descriptor. Composed service descriptor describes an application environment that (recursively) includes multiple applications. A composed service descriptor contains relationships to other composed or elementary service descriptors, and these service descriptors are matched with image and server descriptors to create the application environment. The application environment includes all the resources needed, such as hardware and software, to run the application.

Information that may be included in an elementary service descriptor is as follows:

Elementary Service Descriptor service name, id;

desired application (e.g. application="Oracle", version="8.0");

desired capacity (e.g. metric="TA_rate", TA_rate="300", unit="TA/s").

The information above that may be included in an elementary service descriptor is provided by way of example. A composed service descriptor represents a composition of various application components, such as described in elementary service descriptors, to be aggregated into the descriptor of the desired application.

Information that may be included in a composed service descriptor is as follows:

Composed Service Descriptor service name, id;

desired capacity (e.g., metric="users", users="5000", unit="users");

application components (e.g., a list of elementary and/or composed service descriptors).

The information above that may be included in a composed service descriptor is provided by way of example.

FIG. 2 illustrates a data flow diagram of the composition of an application environment from the descriptors stored in the application-to-resource layer 130, according to an embodiment. At block 201 a service descriptor is received. In this example, the service descriptor is an elementary service descriptor named database. A composed service descriptor may also be received and used to compose an application environment.

The elementary service descriptor, for example, describes an application that nodes in the overlay network 110 have decided to place at the resource-on-demand system 150 instead of other possible hosts. The elementary service descriptor includes workload requirements to be satisfied by the resource-on-demand system 150. In this example, the workload requirements are specified through configuration parameters, such as "application=Oracle, version=8" and capacity parameters, such as 300TA/s.

At block 202, the workload requirements are matched with an image that satisfies the workload requirements by comparing information in image descriptors to the workload requirements. At block 203, an image descriptor is identified that satisfies the workload requirements. The image descriptor includes a description of the type of server needed to host the image. At block 204, the type of server specified in the image descriptor is matched with a server type using server descriptors. The identified server descriptor is shown at block 205. At block 206 the server type in block 205 is matched with an instance of a server that matches the server type description in the server descriptor. The server, for example, is a server from the pool of resources 142 shown in FIG. 1.

Figure 3:
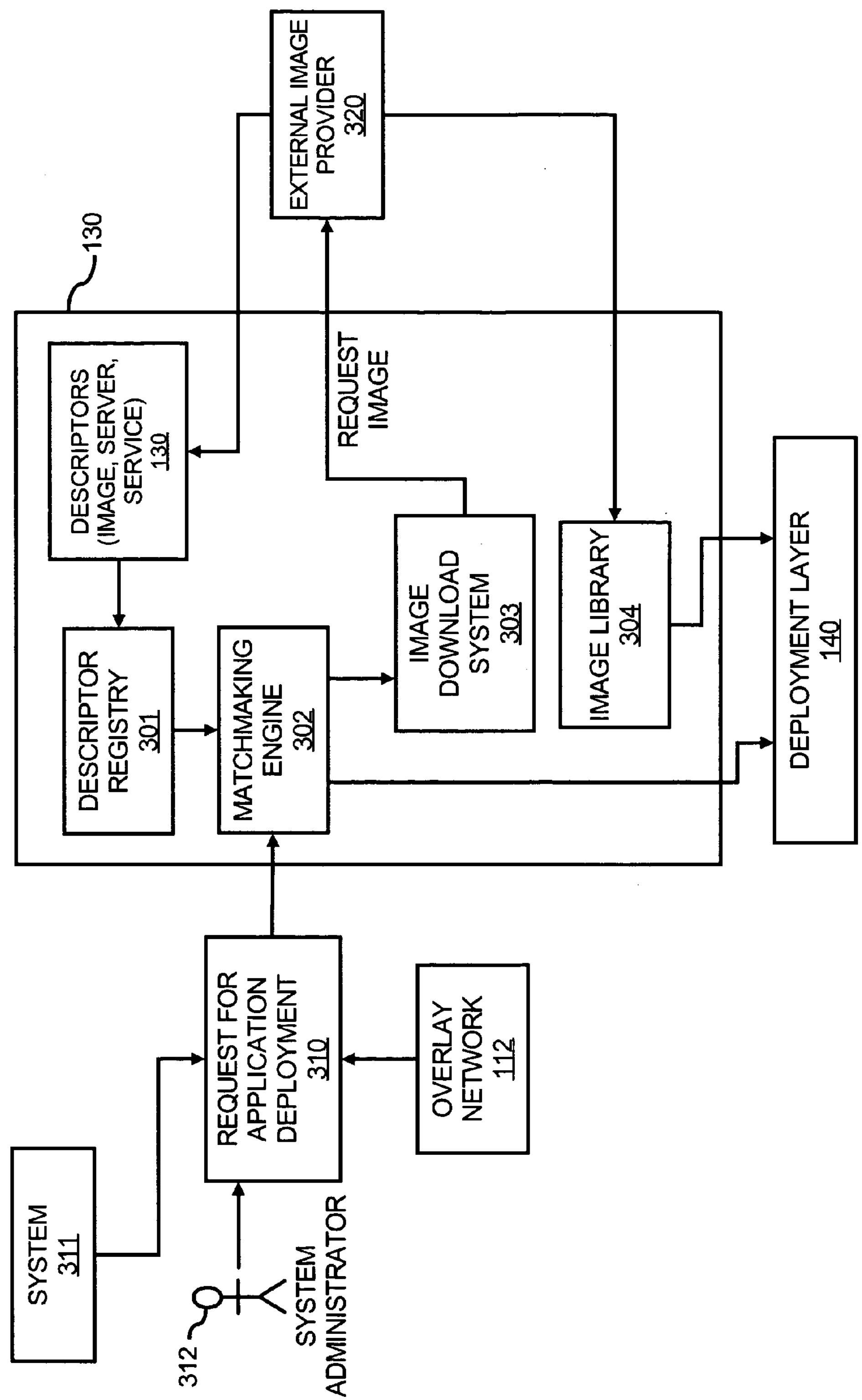
FIG. 3 illustrates an application-to-resource layer, according to an embodiment.

FIG. 3 illustrates a block diagram of the application-to-resource layer 130 according to an embodiment. The layer 130 includes a descriptor registry 301, a matchmaking engine 302, an image download subsystem 303, and an image library 304.

The descriptor registry 301 stores the descriptors described above, such as service descriptors, image descriptors, and server descriptors. The descriptor registry 301 may include a computer-readable storage device. The matchmaking engine 302 performs the matching described with respect to FIG. 2. For example, a request for application deployment 310 including a service descriptor is received by the matchmaking engine 302. The matchmaking engine 302 selects image and server descriptors describing one or more images and hardware resources that satisfy the workload requirements of the application. The request for application deployment, for example, may be generated by the overlay network 112, a system administrator 312, or another system 311, such as another resource-on-demand system. Also, a service descriptor in the received request for application deployment may be stored in the descriptor registry 301.

The image download subsystem 303 is operable to request images from an external image provider 320. The external image provider 320 may be used to initially store images in the image library 304, and may provide an image to the resource-on-demand system 150 when an image is not available that satisfies workload requirements. For example, the matchmaking engine 302 determines that an image is not available with version 8.0 of Oracle. The matchmaking engine 302 sends a request to the external image provider 320, such as a server storing images with current versions of Oracle. The external image provider 320 transmits the image to the resource-on-demand system 150 and the image is stored in the image library 304. Also, an image descriptor for the newly received image is stored in the descriptor registry 301. The image descriptor for the newly received image may be generated by the external image provider 320 or by the layer 130. The image library 304 storing the images, for example, is a storage subarray or another storage device or storage system. The image library may be included in the deployment layer 140 instead of the application-to-resource layer 130.

The descriptors selected during the matching process performed by the matchmaking engine 302 may be sent from the matchmaking engine 302 to the deployment layer 140. The deployment layer uses the selected descriptors, such as the image descriptors and the server descriptors, to install an image from the image library 304 on a resource, such as an image matching the image descriptor that is installed on a server matching the server descriptor.

Figure 4:
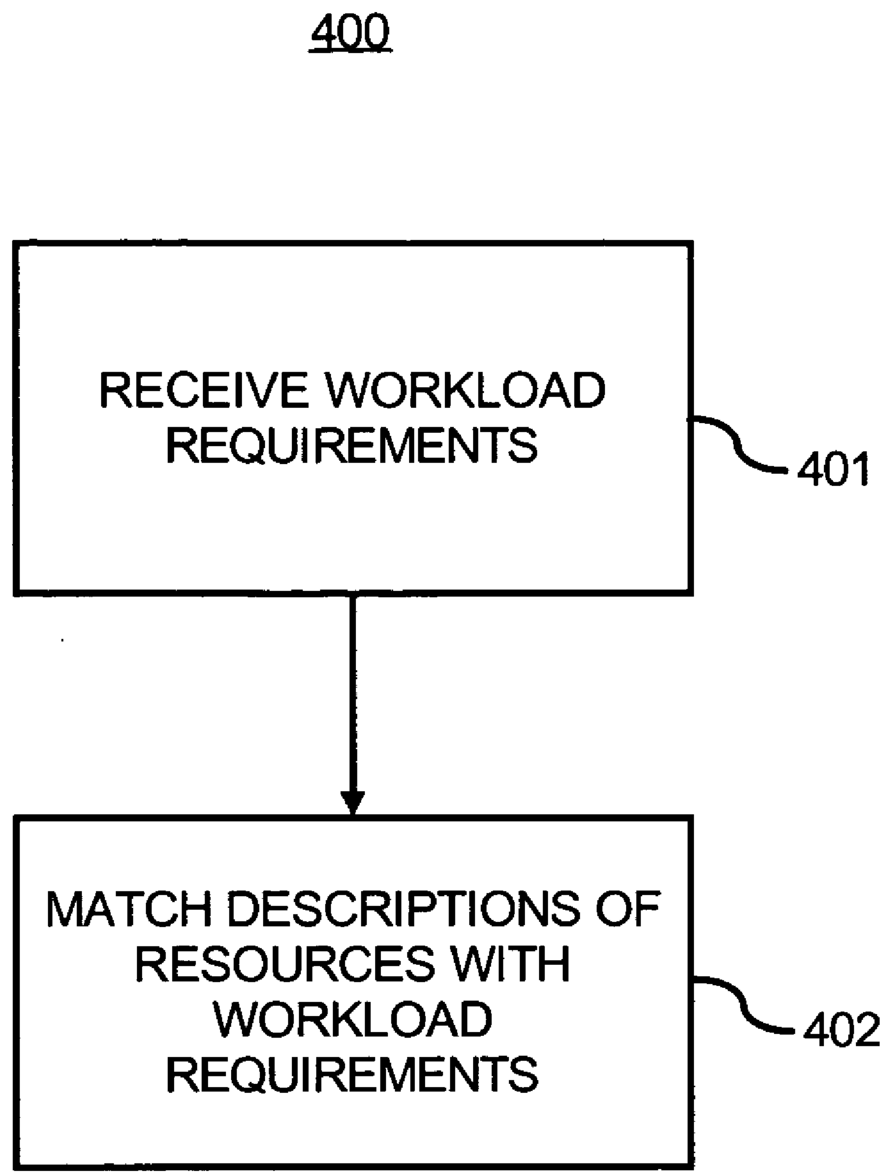
FIG. 4 illustrates a flow chart of a method for matching resources with workload requirements, according to an embodiment.

FIG. 4 illustrates a flow chart of a method 400 for deploying an application, according to an embodiment. The method 400 is described with respect to one or more of the FIGS. 1-3 by way of example and not limitation.

At step 401, the resource-on-demand system 150 shown in FIGS. 1 and 3 receives workload requirements for an application to be deployed in the resource-on-demand system 150. The received workload requirements, for example, are a description of the workload requirements for the workload to be hosted. The workload requirements may include at least one capacity parameter specified in a metric, such as transaction per second or number of simultaneous users or sessions. The capacity parameter may be used for application sizing, such as to determine the size of the application to be deployed. The workload requirements may include configuration parameters, such as the application name and version. A service descriptor including a description of workload requirements is shown in FIG. 2.

At step 402, the matchmaking engine 302 shown in FIG. 3 matches descriptions of resources in the resource-on-demand system 150 with the workload requirements. The matching may include identifying the workload requirements from a service descriptor in a received request for application deployment. Image descriptors describing software resources, such as application components, stored in the descriptor registry 301 are searched to identify an image that satisfies the workload requirements. This may include an image of an application sized based on the capacity parameter.

The server descriptors are searched to identify hardware resource types that satisfy hardware requirements specified in an identified image. For example, a particular image may require a Proliant DL380 type server. Instances of hardware resources in the resource-on-demand system 150 that are of the identified hardware resource type are found and assigned to load the image and run the application. An instance is the actual hardware, such as a Proliant DL380 server in the resource-on-demand system 150.

Figure 5A:
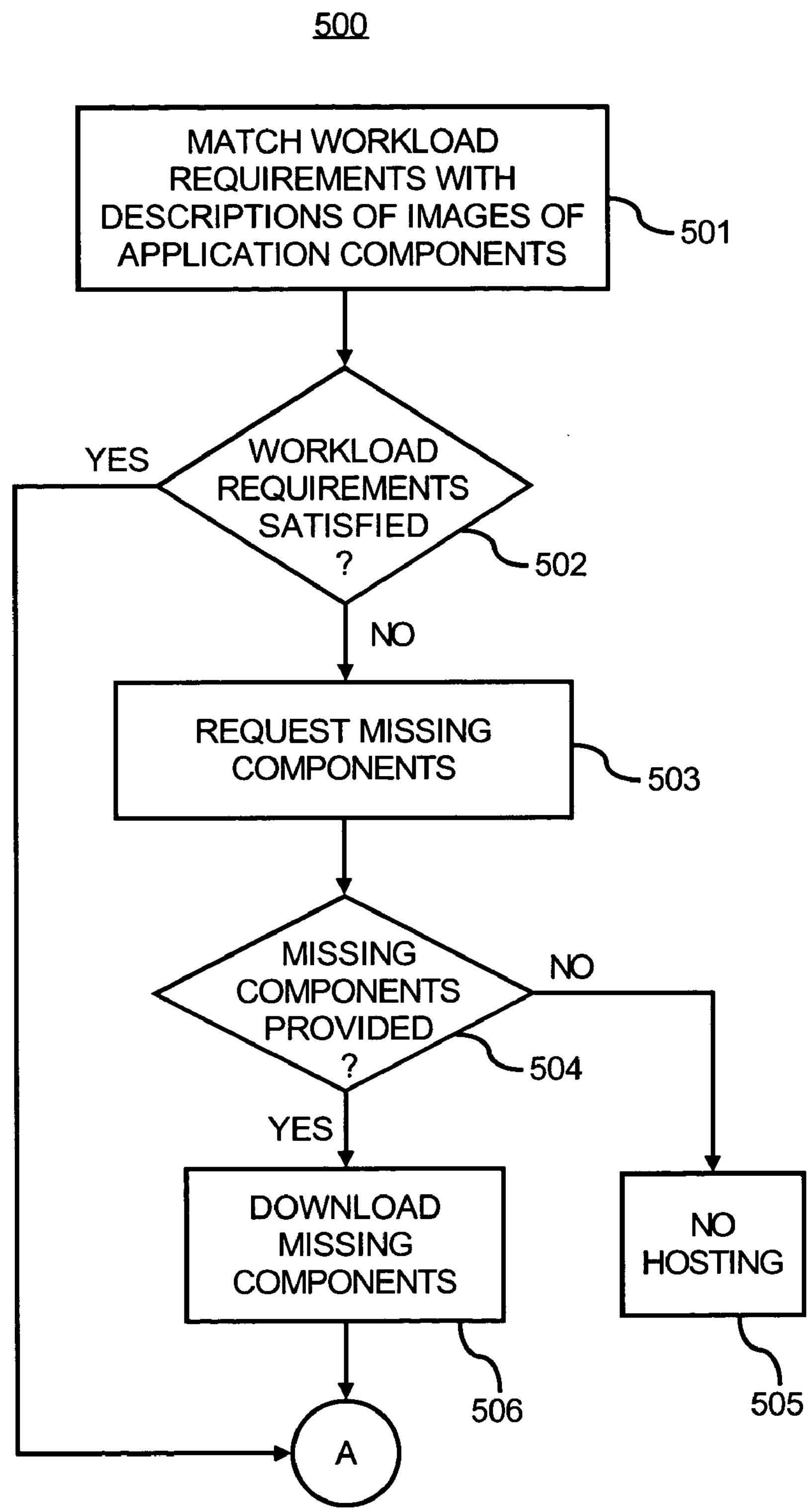
FIGS. 5A-B illustrate a flow chart of a method for matching resources with workload requirements, according to another embodiment.
Figure 5B:
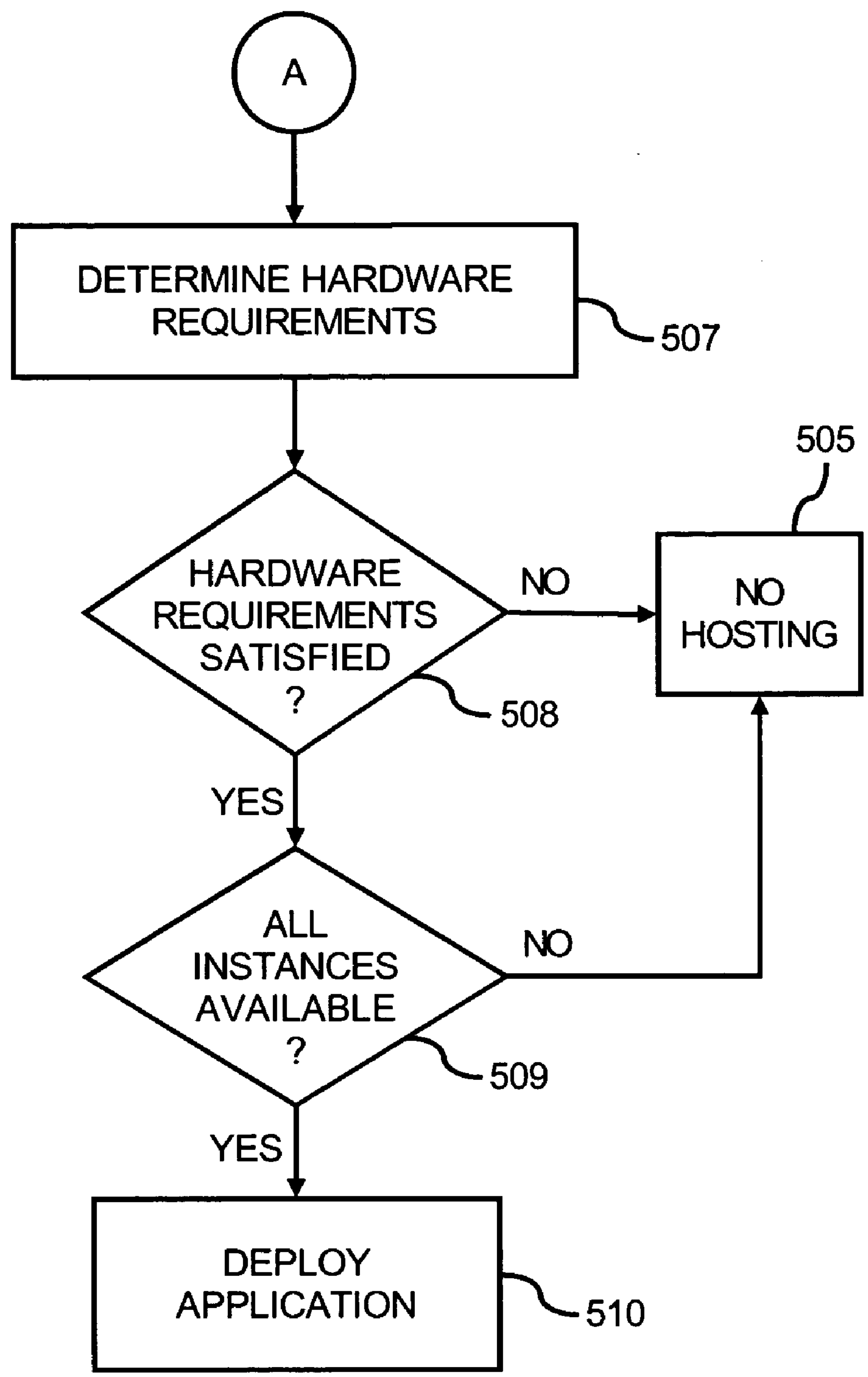

FIGS. 5A-B illustrate a flow chart of a method 500 for matching descriptions of resources performed at step 402 in the method 400. The method 500 provides detailed steps for performing the matching. The method 500 is described with respect to one or more of the FIGS. 1-3 by way of example and not limitation.

At step 501, the matchmaking engine 302 shown in FIG. 3 matches workload requirements in a service descriptor with image descriptors describing images of application components stored in the resource-on-demand system 150. The workload requirements, for example, are a description of the workload requirements for the workload to be hosted, such as provided in a service descriptor. The service descriptor may include one or more service descriptors, such as one or more elementary service descriptors or a composed service descriptor. The service descriptor may be provided in the request for application deployment 310 shown in FIG. 3.

At step 502, the matchmaking engine 302 determines whether one or more images are or need to be stored in the resource-on-demand system 150 that satisfy all the workload requirements. For example, image descriptors are searched to identify an image that is properly sized and satisfies the workload requirements in the service descriptor.

If workload requirements cannot be satisfied with the images stored in the resource-on-demand system 150, the matchmaking engine 302 requests one or more images of the missing application components at step 503 from the external image provider 320 shown in FIG. 3. If the external image provider 320 cannot provide the missing application components, such as determined at step 504, the matchmaking engine 302 sends an indication that the application cannot be hosted at the resource-on-demand system 150 at step 505. If the external image provider 320 can provide the missing application components, such as determined at step 504, the missing components are downloaded to the resource-on-demand system 150 at step 506.

At step 507, the matchmaking engine 302 determines the hardware requirements from the image descriptors, such as server types or other hardware resource types. At step 508, the matchmaking engine 302 determines whether the hardware resource requirements can be satisfied by hardware resources in the resource-on-demand system 150. For example, the server descriptors are searched to identify server types specified in the selected or identified image descriptors. If the server types on the image descriptors are not in the resource-on-demand system 150, step 505 is performed. If the server types on the image descriptors are in the resource-on-demand system 150, such as determined by a server descriptor matching the image descriptor, step 509 is performed.

At step 509, a determination is made as to whether all the instances of server types specified in the matching server descriptors are available in the resource-on-demand system 150. Availability of a resource may include determining whether the resource is in the resource-on-demand system 150. Availability may also include determining whether the resource can be assigned to the application. A resource may be busy running another application and the system 150 may not be able to reassign resources to make the resource available to run another application. If not, step 505 is performed. If all the instances are in the resource-on-demand system 150 are available, the application is deployed at step 510.

Figure 6:
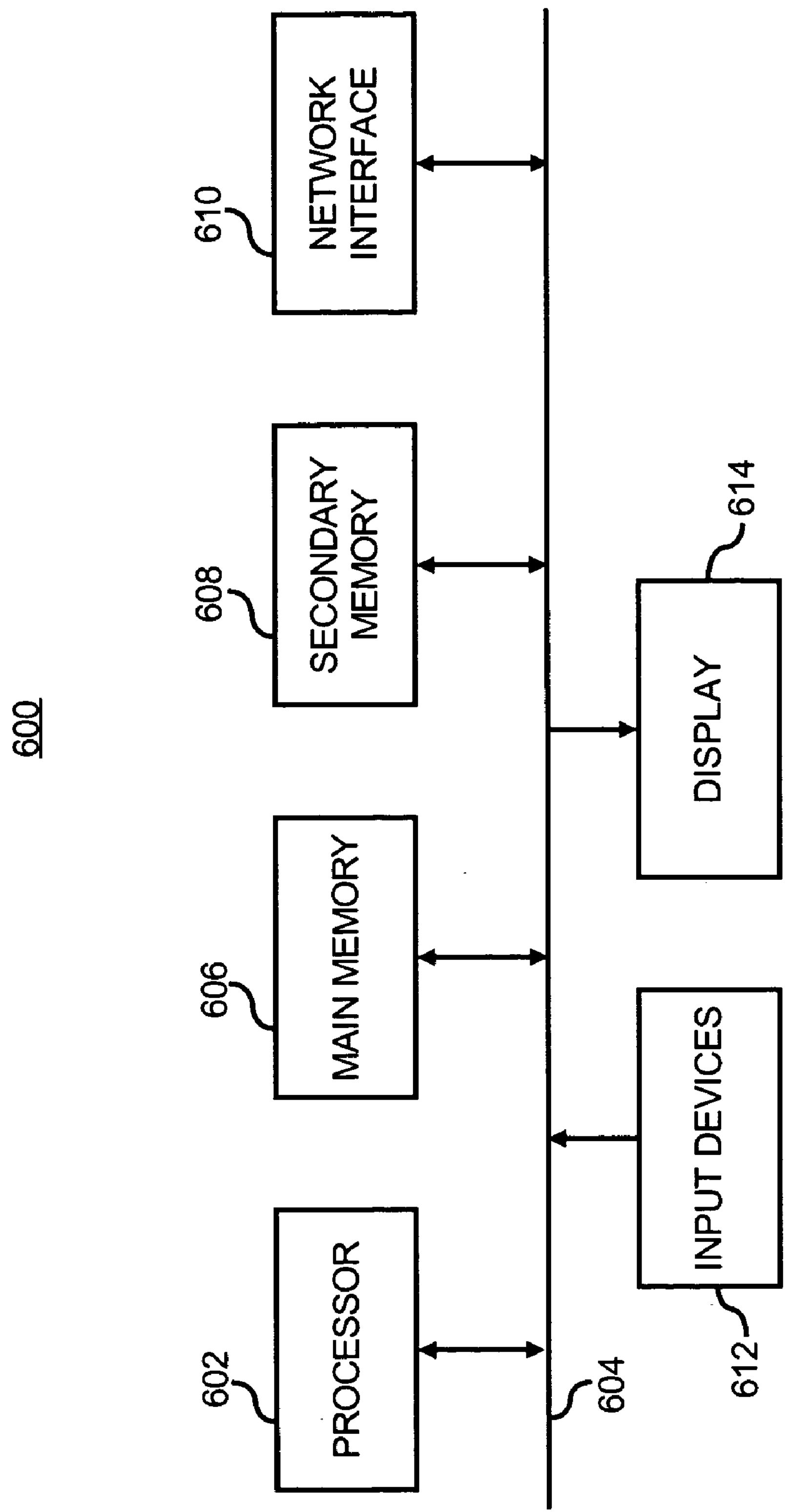
FIG. 6 illustrates a computer system, according to an embodiment.

FIG. 6 illustrates a block diagram of a general purpose computer system 600 that may be used for the application-to-resource layer 130 shown in FIG. 3. It will be apparent to one of ordinary skill in the art that a more sophisticated computer system may be used. Furthermore, components may be added or removed from the computer system 600 to provide the desired functionality.

The computer system 600 includes one or more processors, such as processor 602, providing an execution platform for executing software. Commands and data from the processor 602 are communicated over a communication bus 604. The computer system 600 also includes a main memory 606, such as a Random Access Memory (RAM), where software may be resident during runtime, and a secondary memory 608. The secondary memory 608 includes, for example, a hard disk drive and/or a removable storage drive representing a floppy diskette drive, a magnetic tape drive, a compact disk drive, etc., or a nonvolatile memory where a copy of the software may be stored. The secondary memory 608 may also include ROM (read only memory), EPROM (erasable, programmable ROM), EEPROM (electrically erasable, programmable ROM). The computer system 600 may include user interfaces comprising one or more input devices 612, such as a keyboard, a mouse, a stylus, and the like. A display 614 may also be provided. The input devices 612 and the display 614 are optional. A network interface 610 is provided for communicating with other computer systems.

The main memory 606 and the secondary memory 608, either singly or in combination, are a storage device for storing information and computer programs. For example, the main memory 606 and the secondary memory 608 may store one or more computer programs performing the functionality of the matchmaking engine 302 shown in FIG. 3. The processor 602 executes the one or more computer programs. The descriptor registry 301 shown in FIG. 3 may include the main memory 606 and/or the secondary memory 608 or may be provided in an external storage device 620 shown in FIG. 6.

The steps of the methods 400 and 500 and other steps described herein may be implemented as software stored on a computer readable medium, such as the memory 606 and/or 608, and executed on the computer system 600, for example, by the processor 602.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A computer-implemented method comprising:

receiving workload requirements describing requirements for an application to be deployed in a system, wherein the workload requirements comprise at least one application capacity parameter; and matching, using a processor, descriptions of resources in the system with the workload requirements, wherein the descriptions of the resources in the system include image descriptors of the resources describing application components that are operable by the resources, and wherein the matching includes determining a size of an image of application components for the application to be deployed based on the at least one application capacity parameter, and based on the determined image size and the image descriptors of the resources in the system, identifying a particular image of resources in the system, from among multiple images of resources in the system, the particular image including particular application components for providing an environment to deploy the application.

2. The method of claim 1, further comprising:

deploying the application using resources described in the matching descriptions.

3. The method of claim 1, wherein matching descriptions of resources in the system with workload requirements further comprises:

identifying a description of application components that satisfy the workload requirements;

identifying a description of hardware components that satisfy hardware requirements specified in the description of application components; and identifying an instance of hardware components in the system that match the description of hardware components.

4. The method of claim 1, wherein identifying particular image of the resources further comprises:

searching the image descriptors stored in the system for an image descriptor describing an image satisfying the determined image size for the application to be deployed, wherein the stored image descriptors describe images stored in the system; and in response to the image descriptor not being stored in the system, requesting the image satisfying the workload requirements from another system.

5. The method of claim 3, wherein identifying a description of hardware components that satisfy hardware requirements specified in the description of application components further comprises:

searching server descriptors stored in the system for a server descriptor describing hardware resources that satisfy hardware requirements specified in the description of the application components, wherein the stored server descriptors describe hardware resources in the system.

6. The method of claim 5, wherein the hardware requirements specify hardware resources that are needed to run application components in the image satisfying the workload requirements.

7. The method of claim 1, wherein the at least one capacity parameter is normalized to a chosen base unit such that the at least one capacity parameter is a benchmark for comparison of capacity parameters of heterogeneous resources.

8. The method of claim 7, wherein the at least one normalized capacity parameter further comprises:

application capacity expressed in terms of service shares or resource shares, wherein a resource share is a benchmark expressing a resource's capability of handling a maximum amount of workload related to a particular type of application or class of service and a service share is a function of the resource share.

9. The method of claim 1, wherein matching descriptions of resources in the system with workload requirements further comprises:

determining whether application components or hardware components are configured to be provided by the system that satisfy the workload requirements; and in response to determining the system is not configured to provide application components or hardware components that satisfy the workload requirements, sending notification to host the application in another system.

10. The method of claim 1, wherein the system is a resource-on-demand system.

11. The method of claim 1, wherein receiving workload requirements further comprises:

receiving a service descriptor including the workload requirements, wherein the service descriptor includes a description of an application environment including capacity parameters and a description of application components and maps a relationship between a desired capacity for an application environment and the needed application components.

12. The method of claim 11, wherein the service descriptor comprises:

a composed service descriptor referencing a plurality of service descriptors for application components that are combined to compose an application for the composed service descriptor.

13. A method comprising:

receiving workload requirements describing requirements for an application to be deployed in a resource-on-demand system, wherein the workload requirements comprise at least one application capacity parameter;

searching, using a processor, image descriptors, which include image descriptions, of images stored in the resource-on-demand system for an image that satisfies the workload requirements, wherein the searching includes, determining a size of an image of application components for the application to be deployed based on the at least one application capacity parameter, and based on the determined image size and the image descriptors, identifying a particular image of resources in the system, from among multiple images of resources in the system, the particular image including particular application components for providing an environment to deploy the application;

determining hardware requirements specified in the identified image for the image satisfying the workload requirements;

searching server descriptors of hardware resource types in the resource-on-demand system that satisfy the hardware requirements specified in the identified image; and identifying instances of the hardware resource types from hardware resources in the resource-on-demand system.

14. The method of claim 13, further comprising:

deploying the application including the image that satisfies the workload requirements on the instances of the hardware resource types.

15. A resource-on-demand system comprising:

a computer readable storage device storing descriptors, including descriptions, of resources in the system, wherein the descriptors of the resources in the system include image descriptors of the resources describing application components that are operable by the resources; and a matchmaking engine configured to receive workload requirements describing requirements for an application to be deployed in the system, wherein the workload requirements comprise at least one application capacity parameter, and identify software and hardware resources in the system which match the workload requirements with the descriptors of the resources, wherein the matchmaking engine is further configured to determine a size of an image of application components for the application to be deployed based on the at least one application capacity parameter and, based on the determined image size and the image descriptors of the resources in the system, identify a particular image of the resources in the system, from among multiple images of resources in the system, the particular image including particular application components for providing an environment to deploy the application.

16. The system of claim 15, further comprising:

a deployment layer configured to deploy the application on the hardware and software resources.

17. The system of claim 15, wherein the software resources comprise images, the system further comprising:

storage for storing the images.

18. The system of claim 17, wherein the descriptors further comprise:

server descriptors describing types of servers configured to be deployed to run an application.

19. An apparatus comprising:

means for receiving workload requirements describing requirements for an application to be deployed in a system, the workload requirements comprise at least one application capacity parameter;

means for searching image descriptors of application components stored in the system for at least one application component that satisfies the workload requirements, wherein the means include means for determining a size of an image of application components for the application to be deployed based on the at least one application capacity parameter, and means for, based on the determined image size and the image descriptors in the system, identifying a particular image of resources in the system, from among multiple images of resources in the system, wherein the particular image includes the at least one application component for providing an environment to deploy the application;

means for searching server descriptors of hardware resource types in the system that satisfy hardware requirements in the at least one application component that satisfies the workload requirements; and means for identifying instances of the hardware resource types from hardware resources in the system.

20. A computer program provided on a computer readable storage device and comprising code that when executed causes a computer to perform the following:

receiving workload requirements describing requirements for an application to be deployed in a system, the workload requirements comprise at least one application capacity parameter;

searching image descriptors of application components stored in the system for at least one application component that satisfies the workload requirements, wherein the searching includes determining a size of an image of application components for the application to be deployed based on the at least one capacity parameter, and based on the determined image size and the image descriptors, identifying a particular image of resources in the system, from among multiple images of resources in the system, wherein the particular image includes the at least one application component for providing an environment to deploy the application;

searching server descriptors of hardware resource types in the system that satisfy hardware requirements in the at least one application component that satisfies the workload requirements; and identifying instances of the hardware resource types from hardware resources in the system.

* * * * *